US005216541A

United States Patent [19]

Takesue et al.

[11] Patent Number: 5,216,541

[45] Date of Patent: Jun. 1, 1993

[54] OPTICAL ASSOCIATIVE IDENTIFIER WITH REAL TIME JOINT TRANSFORM CORRELATOR

[75] Inventors: Toshiharu Takesue, Chiba; Yasuhiro Takemura, Shiroi, both of Japan

[73] Assignee: Sumitomo Cement Company Ltd., Japan

[21] Appl. No.: 520,400

[22] Filed: May 8, 1990

[30] Foreign Application Priority Data

May 9, 1989 [JP] Japan .................................. 1-114146

[51] Int. Cl.[5] .......................... G02B 27/46; G06K 9/74

[52] U.S. Cl. .................................... 359/561; 359/559; 382/31; 382/42

[58] Field of Search ...................... 350/162.12, 162.13, 350/162.14; 364/822, 827; 382/31, 32, 42; 359/559

[56] References Cited

U.S. PATENT DOCUMENTS

| | | | |
|---|---|---|---|
| 4,462,046 | 7/1984 | Spight | 350/162.13 X |
| 4,707,077 | 11/1987 | Marom | 350/162.12 |
| 4,955,691 | 9/1990 | Mifune et al. | 350/162.13 |
| 4,958,376 | 9/1990 | Leib | 382/31 |
| 4,961,615 | 10/1990 | Owechko et al. | 350/162.13 X |

OTHER PUBLICATIONS

"A Technique for Optically Convolving Two Functions", C. W. Weaver and J. W. Goodman, Applied Optics, vol. 5, No. 7 pp. 1248–1249, Jul. 1966.

"A Real-Time Programmable Joint Transform Correlator". F. T. S. Yu and X. J. Lu, Optics Communications, vol. 52, No. 1, pp. 10–16, Nov. 1, 1984.

*Primary Examiner*—Bruce Y. Arnold
*Assistant Examiner*—David R. Parsons
*Attorney, Agent, or Firm*—Hoffman, Wasson & Gitler

[57] ABSTRACT

An optical associative identifier is disclosed which is used to determine the closest match between an image to be identified and a plurality of reference images. The identifier includes a display area for displaying the various images, the display area additionally functioning as a spatial light modulator. First and second optical Fourier transform devices are included which are used to compare the reference images to the image to be identified. The output light intensity of each of the reference images is modulated in accordance with a two-dimensional intensity distribution corresponding to the correlation between the image to be identified in each of the reference images. Based upon a comparison of these output light intensities, a match between the image to be identified and one of the reference images can be made.

6 Claims, 5 Drawing Sheets

OPTICAL ASSOCIATIVE IDENTIFIER WITH REAL TIME JOINT TRANSFORM CORRELATOR

BACKGROUND OF THE INVENTION

1. Field of the Invention

The present invention relates to an optical associative identifier to be utilized in the field of optical data processing, and particularly relates to an improved optical associatively identifying apparatus.

2. Description of the Prior Art

There has been proposed a method of obtaining associatively a complete image from an incomplete image by an optical means, as shown in FIG. 1 (the prior art), referring to "Oyou Buturi (Applied Physics): Vol. 57, No. 10, pages 1,522 to 1,527. This method comprises forming multiple holograms 98 by changing the angle of incidence of the reference beam with regard to each of the complex conjugated reference images, forming a hologram 99 for the conjugated wave with regard to the hologram 98, putting an incomplete image A' on the hologram 98, and using the radiation of the beam from the hologram 98 along with the direction of the reference beam to record the complete image A, having high correlation with regard to the incomplete image A', so as to irradiate the hologram 99, thereby, resulting in an output of the complete image A. Further, this complete image is substituted in place of the input of the incomplete image to be fed back through a non-linear feed back amplifier 93, or a nonlinear processing step 94, thereby yielding only one associative output.

However, in this method, a recording media for writing high resolution images is necessary for a memory of recording holographic reference images. The currently available material satisfying such requirement is merely a photographically recording material. However, if the number of the reference images is large, one hologram cannot record all of the reference images. If all of the reference images are recorded in a plurality of separate holograms, the processing operation must use a mechanical changeover switch for holograms. Therefore, the method of the prior art requires the time-consuming development of a hologram, and further needs a very complicated operation for producing holograms because the reference beam has to be changed in its direction for each of the reference images. Further, it was impossible to process these holograms in real time. When the number of reference images is large, the search to find the image will take a great deal of time.

Further, in the prior art, because the range of spatial frequency for good refractive efficiency in producing holograms is fixed, it is impossible to select the range of spatial frequency efficient for the images for comparison or operation. It is therefore impossible to exert both of the outlined association or processing, and the comparison or processing of the detailed or fine portions of the image in the same memory.

SUMMARY OF THE INVENTION

Accordingly, an object of the present invention is to develop an optical associative identifier using feed-back operations based on a joint transform correlator utilizing spatial light modulator.

It is another object of the present invention to provide an optical associative identifier without holographic means, but using an element in which reference images can be easily recorded, in which the correlation processing between the reference images and the image to be identified can be carried out in real time, so as to drastically raise the number of the reference images to be processed.

It is still another object of the present invention to provide an optical associative identifier enabling correct and rapid associative identification because of correlation processing by changing the range of the spatial frequency to write and read the reference image and the image to be identified.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF PREFERRED EMBODIMENTS

Figure 1:
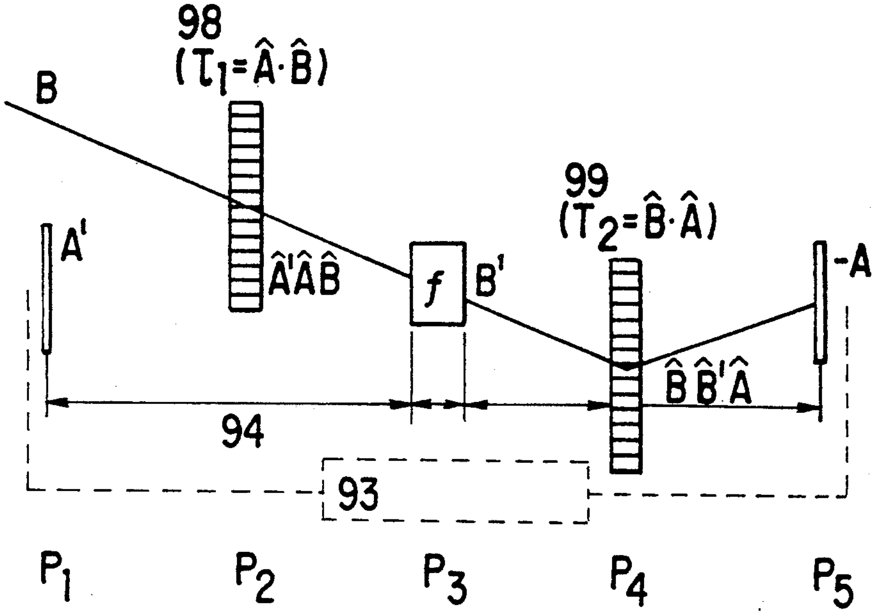
FIG. 1 shows generally a prior art optical associative identifier.

In accordance with the present invention, an optical associative identifier has: (a) a first image output means (i.e. 1 of FIG. 2) capable of displaying simultaneously coherent images, consisting at least of an image to be identified, and reference images, modulating spatially and/or temporally a complex amplitude distribution of the output through optical of electrical addressing; (b) a first optical Fourier transformation means (i.e. 2 of FIG. 2) for transforming optically a two-dimensionally distributed pattern of the output complex amplitude from the first image output means, in a Fourier transformation form; (c) a spatial filter (i.e. 3 of FIG. 2) to restrict an area receiving the output beam from the first Fourier transformation means, into a spatial frequency range corresponding to the portion to be comprehensively compared with a reference image group, of said image to be identified; (d) a second image output means (i.e. 4 of FIG. 2) capable of changing a complex amplitude distribution of a coherent two-dimensional output beam so as to cope with the spatial intensity distribution pattern from the first optical Fourier transformation means (i.e. 5 of FIG. 2) for transforming a two-dimensionally distributed pattern of the output complex amplitude from the second image output means, in a Fourier transformation form, and of giving the output of the transformation as a modifying signal to the first image output means; (f) a means (i.e. 6 of FIG. 2) of detecting the output beam from the second optical Fourier transformation means; and (g) a second spatial filter-control device (i.e. 62 of FIG. 2) for judging the saturation of the associative process in view of the output relative to the cross-correlation of the image to be identified, and being detected by the detecting device, with the reference image, and of changing the beam receiving restriction area of the spatial filter.

The correlation coefficient between one of the reference images and the image to be identified is initially determined for association and identification processing.

The output from the second Fourier transformation device which is corresponding to the correlation coefficient is fed back to the first output device to change the radiation from each of the reference images at the first output device, therefore, the influence from the reference images having a correlation coefficient is selectively removed, so that the correct and rapid selection or identification can be exerted to a number of the reference images.

In accordance with the present invention, spatial patterns corresponding to reference images and an image to be identified can be formed and displayed on a first image output device, and can be Fourier-transformed by a first optical Fourier transformation device so as to produce multiple interference fringes formed by interference between the reference images and the image to be identified. Assuming that the image to be identified would constitute an incomplete image of one of the reference images, the range of spatial frequency to limit the range transmitting through a spatial filter is settled to be a range of spatial frequency corresponding to the size of the image to be associated with the image to be identified. Further, the fine or detailed information necessary to identify the outline of the image can be removed by passing the beam through the spatial filter to limit the spatial frequency range of the reference images and the image to be identified into a certain high frequency range. The coherent beam having the intensity distribution or phase distribution corresponding to the intensity distribution of the multiple interference fringe as formed emits, or radiates from the second image output means (i.e. 45 of FIG. 2).

The complex amplitude distribution pattern of this coherent beam (i.e. 47 of FIG. 2) is Fourier transformed by the second optical Fourier transformation device to produce the two-dimensional intensity distribution representing the outlined shapes, the relative positions of the reference images and the image to be identified, and further the correlation between the reference image and the image to be identified.

This two-dimensional intensity distribution is transferred into the first image output device (i.e. 15 of FIG. 2), and the intensity of the output from the first image output means is such that the portions of the reference images having the high correlation intensity is highly irradiated, and the portions having the lower correlation intensity has lower irradiation.

While the above operation is repeated, the amount of the radiation emitting from the portions of the reference image having a relatively low correlation will be gradually lowered, and the reference images having a shape resembling that of the image to be identified will remain so as to decrease the number of the reference images to be compared, i.e. the candidates. As the number of the candidates is decreased, the visibility of the interference fringes formed by the first Fourier transformation device will be raised so as to enable correct comparison or association of the image to be identified with the remaining reference images.

However, when the image to be identified is lacking one of the reference images, i.e. an incomplete reference image, the intensity of the radiation emitting from this incomplete reference image will be low in the initial stage of the processing operation, but because it has the higher correlation intensity, when the intensity of the radiation emitting from this image is lower than the initial stage, the intensity of the radiation emitting from this reference image will be gradually raised during the repeated operations.

In view of the foregoing, while the processing operations are repeated in accordance with the present invention, the output of the correlation with regard to the reference image will be gradually increased even if the initial output is low. On the other hand, the output from the other reference images which shall not be associated with the image to be identified will be gradually lowered. Therefore, the image to be identified will only be compared with one or a few reference images.

After the associating operations are repeated so as to constrain the candidates to one or a few reference images, the range of spatial frequency to restrict the frequency of the beam passing through the spatial filter is limited to the spatial frequency, so as to enable the determination of the corresponding correlation coefficient, to define enough details of the reference images remaining with the image to be identified. This operation can facilitate rapid and correct associative identification of the image to be tested.

In accordance with the optical associative identifier, the first image output device (i.e. 1 of FIG. 2) essentially consists of at least, (1) a coherent beam source (i.e. 11 of FIG. 2), (2) a first spatial beam modulator (i.e. 15 of FIG. 2) for modulating a spatial distribution pattern of complex amplitude of the beam emitted from said source, and (3) one or more display units (i.e. 16 of FIG. 2) for displaying a reference image group and an image to be identified by the input beam emitted from the spatial beam modulator.

Further, the first spatial light modulator (i.e. crystal liquid light valve 15 of FIG. 2) has a number of fractions in its display, each of the fractions receiving a portion of the output beam (i.e. intensity pattern formed on the screen 52 of FIG. 2), each of which is respectively corresponding to each portion of the beam from the second optical Fourier transformation device (i.e. lens 51 of FIG. 2), and each fraction changes its transmissivity or reflecting power in line with the intensity of the output beam.

When the first spatial light modulator is of an optical addressing type, the beam is directed at the first spatial modulator. When the modulator is of an electric addressing type, the beam is received by the first photoelectric transducer (i.e. two-dimensional transducer 61, e.g. C.C.D.) and the produced signal will be transferred through the image processor and spatial light modulator driving circuit (i.e. 62 of FIG. 2) into the first modulator (i.e. the value 15 of FIG. 2).

The display units (i.e. the portions of the display 16 of FIG. 2) for displaying the reference image group comprises a valve (i.e. **16*a* of FIG. 3) to be operated electrically for modulation. The display units (i.e. the other portions of the display 16 of FIG. 2) for displaying the image to be identified comprises an incoherent-to-coherent converter (16*b* of FIG. 3**).

The first image output device (i.e. of FIG. 2) comprises at least (1) a coherent radiation source (i.e. 11 of FIG. 2) and (2) a second spatial light modulator (i.e. display 16 of FIG. 2) capable of modulating the complex light amplitude distributed with an electric signal for displaying reference image group and an image to be identified.

The second image output device (i.e. 4 of FIG. 2) includes a third spatial beam modulator (i.e. 45 of FIG. 2) for modulating the complex amplitude distribution of the beam received, on the basis of the signal from a two-dimensional photoelectric transducer (i.e. 42 of FIG. 2), receiving the output beam from the first Fourier transformation means (i.e. 21 of FIG. 2) to obtain the output of the modulated complex amplitude distribution.

Figure 6:
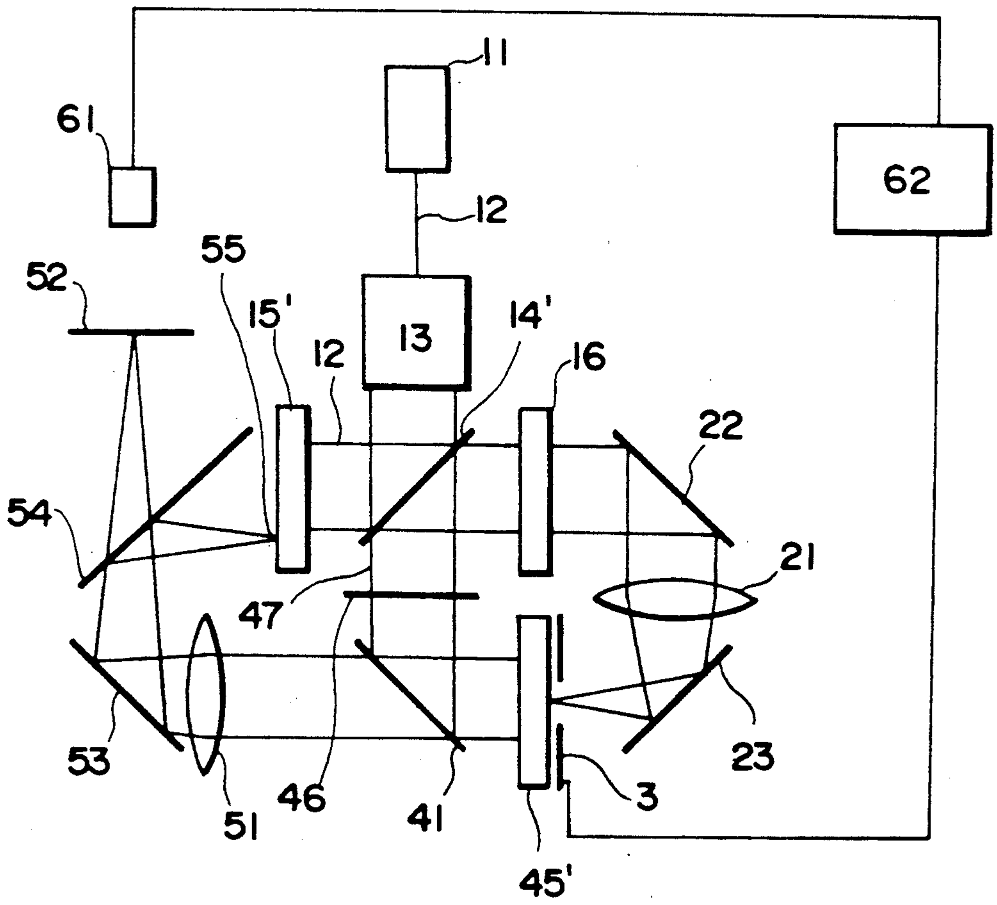
FIG. 6 schematically shows a second type of inventive optical associative identifier.

A second image output device illustrated with respect to FIG. 6, includes at least, a coherent beam source (i.e. 11 of FIG. 6) and a fourth spatial beam modulator (i.e. 45' of FIG. 6) for changing its optical characteristics, in a two-dimensional or three-dimensional form, based upon the intensity distribution of the output beam received from the first Fourier transformation device (i.e. 45' of FIG. 6).

The present invention is further illustrated by the following examples to show an optical associative identifier, but should not be interpreted to limit the scope of the invention.

EXAMPLE 1

Figure 2:
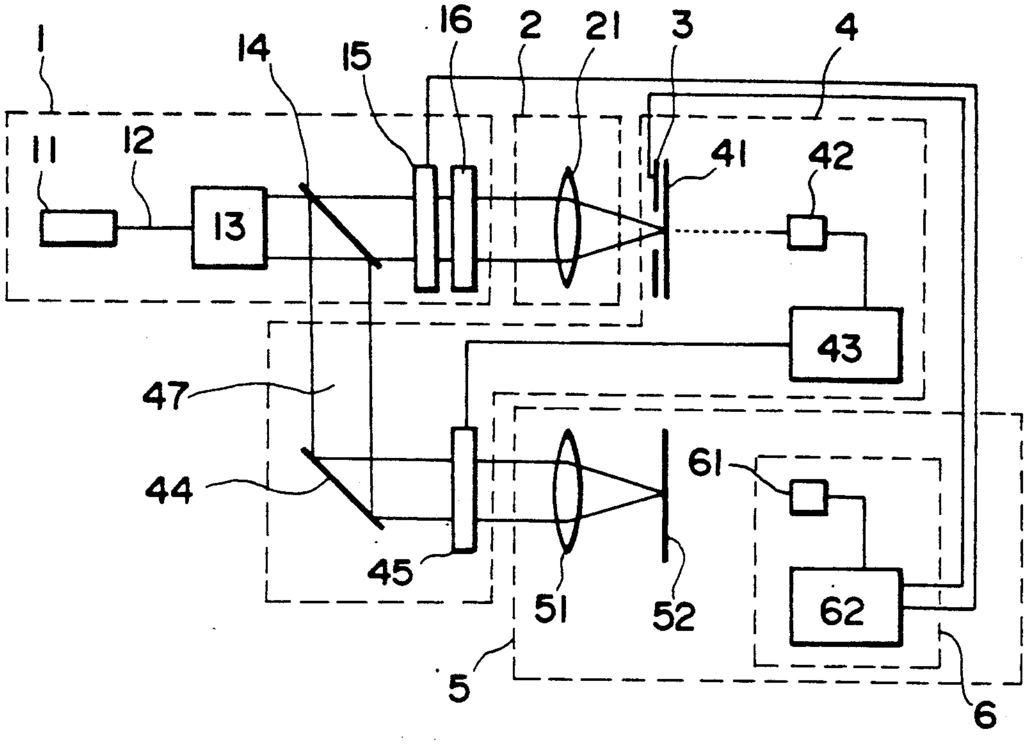
FIG. 2 schematically shows the inventive optical associative identifier.

FIG. 2 schematically shows one preferred embodiment of the inventive optical associative identifier, in an optical arrangement view. In the optical arrangement view of FIG. 2, an optical associative identifier comprises an image output device 1, an optical Fourier transformation device 2, a spatial filter 3, a second image output device 4, a second optical Fourier transformation device 5 and a photodetector 6.

A coherent beam 12 emitting from a source 11, such as a semiconductor laser or a gas laser, is transformed by a beam expander 13 into a beam having an appropriate diameter. The beam is then divided by a beam splitter 14 into the two beams 12 and 47. The beam 12, passing through the beam splitter 14, will then pass through a liquid crystal light valve 15 and enter into a display apparatus 16. A liquid crystal light valve 15 functions as a spatial light modulator to spatially modulate a transmittance distribution formed by the input of electrical signals. A general type of such liquid crystal light valve may be a liquid crystal panel used for a liquid crystal TV or a display for a personal computer.

While this liquid crystal light valve 15 has naturally a uniform transmittance distribution, the transmittance of the area corresponding to the portions of the valve 15 for the reference image having the high correlation to the shape of the image to be identified will be increased. Additionally, the transmittance of the area having the low correlation will be decreased as a result of the processing method discussed hereinbelow.

Figure 3:
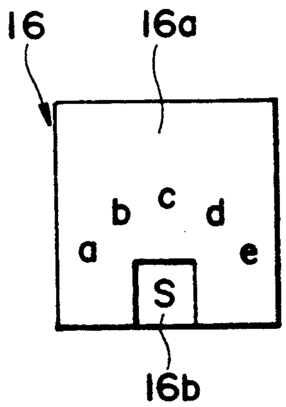
FIG. 3 shows a schematic view of a display apparatus used for the inventive optical associative identifier.

The image display apparatus 16 illustrated with respect to FIG. 3 has two components, i.e. a display portion 16b for an image to be identified and a display portion 16a for the reference image. The display portion 16a for the reference image functions as a spatial light modulator recording the multiple reference images in a photographic film or to display multiple reference images by an electrical input or an optical input. The display portion 16b for the image to be identified functions as a spatial optical modulator to enable an electric or optical input of the image to be identified.

As shown in FIG. 3, for example, the reference images as indicated by a, b, c, d and e are displayed in the display portion 16a, and the image or images to be identified is displayed in the display portion 16b.

The beam 12 passing through the image display apparatus 16 passes further through the Fourier transformation lens 21 and enters into a screen 41 provided at the plane of the Fourier transformation. On this screen 41, the beam intensity proportional to the square of the two-dimensional Fourier transformation of the complex amplitude distribution is observed. The beam intensity distribution formed on the surface of the screen 41 can be detected by a two-dimensional photoelectric transducer 42 using an element such as a charge coupled device (CCD), in which the portions unnecessary to identify the outline of the image are removed or reduced by limiting a field of the spatial filter 3 of a two-dimensional photoelectric transducer 42. The spatial filter 3 functions as a spatial light modulator capable of spatially changing the transmittance distribution of the device, such as a liquid crystal light valve 45, in which the transmittance thereof is adjusted by the image processing apparatus and the spatial filter control device 62 so as to form the transmittance distribution having the higher transmittance in the area within a certain distance from the center of the beam (optical axis) and the lower transmittance in the outer area, allowing only the beam within the spatial frequency range corresponding to the size of the image to pass through the valve 15.

The image produced at the surface of the two-dimensional photoelectric transducer 42 is transferred as electric signals through a video amplifier and a valve driving circuit 43 to the display plane of the liquid crystal light valve 45, to display therein. This liquid crystal light valve 45 functions as a spatial light modulator in a similar way to that the modulator 15, modulating the complex amplitude of the received beam to emit the modulated beam. The beam 47 received by the liquid crystal light valve 45 is one of the previously mentioned two beams into which the beam 12 is divided by a beam splitter 14, and therefore, the source for this modulator is common to the source for the image output device 4.

The beam 47 first passes through the liquid crystal light valve 45, and then passes through a Fourier transformation lens 51 and focuses upon a screen 52. The screen 52 is positioned at the Fourier plane with regard to the liquid crystal light valve 45. The intensity of the radiation on the screen 52 represents the extent of the spatial correlation between the reference image and the image to be identified and the spatial auto-correlation. Therefore, in order to avoid overlapping the cross-correlation of the reference images to each other, the images should be arranged to be formed on the display plane of the image display apparatus. These arranged images formed on the plane can be detected so as to determine the position and the corresponding correlation of the reference image having the strong correlation with the image to be identified, by forming them on the surface of the two-dimensional photoelectric transducer 61.

The intensity distribution corresponding to the corresponding correlation and the peak of the intensity are shown in the schematic view of the image display of FIG. 3 showing each of the patterns displayed in the display plane of the image display apparatus 16. In FIG. 3, the image display apparatus 16 describes (or pictures), for example, the reference images a, b, c, d and 3 in the reference image group, and the image (S) to be identified.

Figure 4:
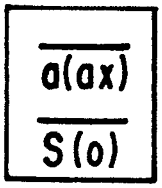
FIG. 4 shows a schematic illustration showing the difference between a reference image and an input image to be tested for the inventive optical associative identifier.

The image to be identified, as shown in FIG. 3, can be recognized to be a reduced image of one of the images selected from the group of the reference images. For example, it can be recognized as shown in FIG. 4 that while the reference image can be indicated by the line having length (2*a*), the image to be identified can be indicated by the line having the length (a).

If the spatial coordinates indicating the position of the image (S) to be identified is temporarily described by the linear function (O), the position of the image (S) is described by the function S(O). The position of the reference image (a) is described by the linear function a(a). The coherent beam irradiates to those patterns, and then Fourier-transformed by a Fourier transformation lens 21, producing an intensity pattern $I(f_x)$ displayed on the screen 41 which can be expressed by the following equation.

$$\begin{aligned} I(f_x) &= |S + A \cdot \exp(j2\pi f_x a_x)|^2 \\ &= |S|^2 + |A|^2 + S^* \cdot A \cdot \exp(j2\pi f_x a_x) + c.c. \end{aligned} \tag{1}$$

wherein $f_x$ is a spatial frequency in the X axis direction, S and A are complex amplitudes of Fourier transformation of beam amplitude distribution respectively of the image to be identified and the reference images, the mark * represents a complex conjugate of amplitude distribution of each image.

Herein, S and A are indicated by the following equations.

$$S = \{\sin(\pi \cdot a \cdot f_x)/\pi \cdot a \cdot f_x\} \cdot a$$

$$A = \{\sin\{2\pi a f_x)/2\pi a f_x\} \cdot 2a$$

Because the intensity of the images displayed on the screen 41 is described by the equation:

$$I(f_x) = (|S|^2 + |a|^2)\{1 + m \cdot \cos(2\pi a f_x)\},$$

the extent of the visibility (m) of the interference fringe formed on the screen 41 is described by the following equation.

$$\begin{aligned} m &= 2SA/(|S|^2 + |a|^2) \\ &= \frac{2\sin(\pi a f_x) \cdot \sin(2\pi a f_x)}{\sin^2(\pi a f_x) + \sin^2(2\pi a f_x)} \end{aligned}$$

Therefore, when $f_x$ approaches to 0 in a lower frequency range, the intensity (m) is 4/5.

If the reference images are screened by a mask having the transmittance of K, the visibility of the interference fringe is described by the following equation.

$$m' = \frac{2\sin(\pi a f_x) \cdot \sin(2\pi a f_x) \cdot K}{\sin^2(\pi a f_x) + \sin^2(2\pi a f_x) \cdot K}$$

Therefore, when the transmittance cf the mask is $$K = \sin(\pi a f_x)/\sin(2\pi a f_x),$$

the maximum value of the visibility (m') is 1. Accordingly, if the spatial frequency ($f_x$) approaches to 0, and $K = \frac{1}{2}$, the contrast of the interference fringe is maximized.

The intensity $I(f_x)$ in the image pattern is written as a transmittance distribution formed on the plane of the liquid crystal light valve 45, and then, is again Fourier-transformed by a Fourier transformation optical system. The resulting intensity distribution I(x) in the image pattern formed on the plane of the screen 52 is described by the following equation (2).

$$\begin{aligned} I(x) &= I(f_x) \cdot \exp(-j2\pi f_x x)df_x \\ &= s \;\; s + a \;\; a + s \;\; a\{\delta(a_x - x)\delta(a_x + x)\} \end{aligned} \tag{2}$$

wherein the mark of * represents the correlation, relationship.

The auto-correlation of each image can be indicated on the center of the beam, and the corresponding correlations between the reference images and the image to be identified appear in a pair of patterns at the positions which are symmetric to each other with respect to the optical axis, having a distance from the center of the beam which corresponds to the correlative position between the reference image and the image to be identified.

Accordingly, the peak of the corresponding correlation between the reference image and the image to be identified will appear at the position on the plane of the screen 52 corresponding to the position of each of the reference images formed on the plane of the image display apparatus 16.

The product of s*a is relative to the visibility of the interference fringe formed on the Fourier transformation plane, and m/4, wherein m is the total amount of the irradiation in the corresponding correlation. Therefore, when the reference image is partly lacking, the Fourier transformation image of the spatial frequency in the lower frequency range gives the raised corresponding correlation even upon the screening of the image ($k = \frac{1}{2}$). The above-mentioned phenomenon will always occur when the portion of the image to be identified is shielded.

When only the portion of the image to be identified matches the portion of the reference image, i.e. when the correlation is complicated, the total visibility will be raised in case of the reference image being shielded.

However, when the number of the reference images is large, it will be impossible to definitively read the correlation peak of the reference image group to the image to be identified. This is due to the fact that the correlation term in equation (2) corresponds to the formation of the interference fringe produced by the overlaying of the Fourier transformation patterns for each of the reference images in equation (1). Therefore, the increase of the number of the reference images will drastically reduce the visibility of the interference fringe, resulting in lowering the light intensity of the correlation peak. Furthermore, when the fineness and the dynamic range of the distribution of the interference fringes are greater than the resolution or dynamic range of the spatial light modulator, it will be impossible to obtain the correct output of the correlation peak.

Accordingly, in this embodiment, the light intensity for irradiating each of the reference images is changed by sensing the light intensity formed on the screen 52, and feeding the resulting electric signals to the image processing and valve driving circuit 62, for regulating the corresponding correlations of each of the reference images, and then determining the distribution of the transmittance on the liquid crystal light valve 15. For example, if the reference image having the highest correlation to the image to be identified is the image (b), the transmittance of the portion of the plane in the liquid crystal light valve 15 through which image (b) passes is maximized for the other reference images. For example, the amount of irradiated image (a) will be the amount of s*a/s*b for the irradiation to the image (b). This is accomplished by controlling the transmittance of the plane portion of the liquid crystal light valve through which the beam to irradiate the reference image (a) passes.

This process of forming the correlation image by changing the transmittance of the plane portions of the liquid crystal light valve 15, and then, changing the irradiance to irradiate each of the reference images, and to transmit the formed correlation image to the input for further process can be repeatedly attempted.

Figure 5:
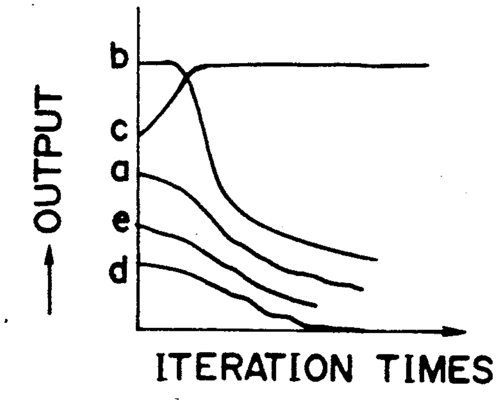
FIG. 5 is a graph showing the relation of the output of a photodetecting means 6 in FIG. 2, plotted against the number of correlation iteration carried out in the optical associative identifier of the present invention.

FIG. 5 is a graph showing the relation of the output formed on the screen 52, plotted against the iteration numbers to form the reference images, when the image (S) to be identified corresponds to a pattern of the partial reduction of the reference image.

As shown in the graph of FIG. 5, the light intensity obtained by the correlation peak outputs reference images such as images (a), (b), (d) and (e) will be lowered as the iteration times increase. This should be contrasted to image (c), whose light intensity obtained by the correlation to the image (c) will increase as mentioned above by raising the transmittance of the corresponding interference fringe formed on the screen 41. On the other hand, the peak of the corresponding correlation of the image to be identified with the reference image (b) will produce an unbalanced light intensity, and the irradiation will be reduced in several trials to form the correlation pattern. Therefore, in case of a reference image not similar to the image to be identified, the interference fringe with the image to be identified is not formed even at the portion of the photoelectric transducer which is less irradiated by the beam. Consequently, the peak of the corresponding correlation of the light intensity will be simply reduced. As a result, the reference image (c) is induced as an image to be associated with the image to be identified.

When there are found several reference images having high correlation, the reference images having a significantly low correlation with the image to be identified, should, and can be removed as a candidate by setting a threshold level to the correlation formed, in an early stage of operation, to minimize the transmittance of the portions in the transducer in which the images with low correlation are formed. Further, the reference images having the correlation lower than the predetermined threshold value at the stage after the predetermined number of iterations to form the correlation, are removed as a candidate, and then, a rapid match can be attained.

Since the number of the candidates can be reduced at an early stage of the processing, the number of the candidates to be compared can be smaller. Therefore, the visibility of the interference fringe can be increased so as to yield the correct identification. Furthermore, when there are several candidate images which should not be associated with the image to be identified, but have the higher corresponding correlation with the image to be identified, the light intensity of the irradiation peak formed by the corresponding correlation peak of the image which should be associated with the image to be identified will be relatively smaller in an early stage, but will be raised during the repeated processing. The irradiated light intensity to the reference image should be at a maximum among all the reference images at the point when the light intensity of the correlation peak exceeds the light intensity of the correlation peak formed by the reference image having the high correlation peak in the initial stage of the processing, or, alternatively at the point when the change of the light intensity of both peaks becomes stable of flat, in order to give more rapid convergence of the associated reference images.

After the operations to form the stronger correlation are repeated the requisite number of times, and the corresponding correlation becomes unchangeable or stable as a whole, the correlation values to the respective reference images are compared one to the other, to yield a temporary conclusion for the correlations.

In the above mentioned example, the transmittance to be changed or modulated should be adjusted or controlled to be higher at the portions having substantially higher correlation of the reference images, and lower at the portions of the other reference images having the lower correlation with regard to the image to be identified. For example, when the reference image having the highest correlation is the reference image (b), the processing to associatively identify the image can be exerted by assuming that the light intensity to irradiate the other reference image, e.g. (a) is f(s*a)/f(s*b) with regard to a monotonic increase function f(x).

The output of the correlation peak can be converged by the above-mentioned processing, and then, only one or a few candidates having the high correlation output can be determined. Then, the imaging processing and valve driving circuit 62 is properly arranged or adjusted so that the range of the spatial frequency restricting the spatial filter 3 will be expanded to the range of the spatial frequency, to enable identification of the detailed portions of the image.

For example, when only one reference image and the image to be identified are given by the valve 15 and the display apparatus 16, the interference fringe patterns formed by the interference of the Fourier transformation patterns of the reference image and the image to be identified are irradiated and formed on the screen 41. The patterns formed on the screen are read by the apparatus 42, and written on the valve 45. Therefore, the correlation peak outputs are formed on the screen 52, depending on the interference fringe, at the positions corresponding to the distance between the said two images. This output of the correlation peak will represent the correlation of the two images. Consequently, the position of the peaks for the completely identical images can be assumed, and the gap or difference of the actually detected position from the assumed position is measured. Therefore, one can determine which portions of the image to be identified are lacking or defective, as compared with the reference image.

The candidates of the reference images are restricted as a conclusion of the above-mentioned processing, and then, the visibility of the interference fringe formed by the interference between the reference images and the image to be identified formed on the screen 41 can be improved, so that the output of the corresponding correlation could be formed with high accuracy on the screen 52, even by using a two-dimensional photoelectric transducer 42 and a liquid crystal light valve 45 having low resolution and small dynamic range. As described above, the inventive associative identifier can facilitate the determination of the correlation obtained in the initial associating process. The lacking portions of the image to be identified and the extent thereof, so as to ensure identification of the image to be identified are also ascertained.

EXAMPLE 2

FIG. 6 illustrates another preferred embodiment of the inventive optical associative identifier.

In the associative identifier shown in FIG. 6, the beam 12 emitting from a laser source 11 passes through a beam expander 13, and enters into a polarization beam splitter 14'. Only an s polarized component of the beam 12 is reflected by the polarization beam splitter 14' and the p polarized component of the beam 12 will pass through the splitter 14' to produce a beam 47.

Subsequently, the beam 12 consisting of the s polarized component enters into a reflection type of liquid crystal light valve 15' having the structure illustrated in FIG. 7. The liquid crystal light valve 15' has a reflecting liquid crystal valve surface 70 having fractioned portions **70*a* as shown in the elevational view of FIG. 7. The liquid crystal light valve 15' has a layered structure as shown in the sectional view of FIG. 7, having anti-reflection coating layers 79, glass layers 71 and 76, transparent electrodes 72 and 78, spacers 73, a liquid crystal layer 74, a dielectric mirror 75 and a photoconductive layer 77**.

This type of the liquid crystal light valve has a photoconductive layer 77 and a dielectric mirror 75 arranged between the transparent electrodes 72 and 78. The photoconductive layer is as shown in the elevational view of FIG. 7, fractioned into portions of necessary size for the image to be identified. The size of the fractioned portions in the liquid crystal light valve 15' is the same size as that of the reference images formed in the image display apparatus 16.

The dielectric mirror 75 is arranged at the position near to the liquid crystal layer (the right side in the drawing) next to the photoconductive layer 77. The reading beam B enters from this side of the structure, and reads the images. The voltage is applied between the two transparent electrodes 72 and 78, and then, the writing beam is irradiated at the structure, the voltage reduction in the photoconductive layer 77 being generated in the respective portions **70*a* in accordance with the light intensity of the addressing beam A. The reading beam B entering the valve 15' is rotated in the direction of polarization. Accordingly, the direction of polarization of the beam 12 is rotated depending on the intensity of the addressing beam A. The reflected beam then passes through the polarizing beam splitter 14' depending on the intensity distribution of the addressing beam A, and enters into the display apparatus 16. The identifier is designed so that the uniform irradiation amount passes over the range in the beam at the beginning of the processing, and through the polarization beam splitter 14'**, by adjusting the applied voltage for biasing, or applying a biasing beam.

The beam 12 passing through the polarizing beam splitter 14' enters into the image display apparatus 16, is reflected through a mirror 22, passes through Fourier transformation lens 21, and forms the intensity distribution pattern of the image to be identified and the reference images formed on the image display apparatus 16. The beam is then reflected by the mirror 22 and passes through the lens 21, and is reflected by the mirror 23 to form a Fourier transformation of a complex amplitude pattern on the plane of the liquid crystal light valve 45'. The liquid crystal light valve 45' is substantially the same as the liquid crystal light valve 15', and the beam 12 is an addressing beam A. The size of the fractioned portions in the valve 45' will be reduced depending on the size of the patterns of the interference fringe entering the valve 45'.

The reading beam B to be applied to the liquid crystal light valve 45' is a beam 47 passing through the polarizing beam splitter 14'. The beam 47 passes through a half wavelength plate 46 to rotate its polarization direction by 90°, and then enters into the polarizing beam splitter 41. The polarization of the beam 47 is the s component relative to the polarization beam splitter 41, and therefore, can be substantially reflected by the polarizing splitter 41, and enters into the liquid crystal light valve 45' to function as a reading beam for the pattern formed on the valve 45'.

The incident beam 47 entering into the valve 45' is modulated in the valve 45' in a similar way to that of the beam 12 in the valve 15'. The pattern formed, corresponding to the Fourier transformation of the complex amplitude distribution by the beam entering into the valve 45' and reflected thereby, will pass through the splitter 41, through a Fourier transformation lens 51 and be reflected by a mirror 53. The pattern would then pass through the half-mirror 54, and will form the focus on the screen 52 and the valve 15'. The incident beam 47 entering into the valve 15' is provided at the position 55 in the image to be identified formed on the surface of the valve 15'. The position of the reference images and the optical arrangement are previously designed so that the respective corresponding correlation peaks are located at the position of the reference image formed on the valve 15'.

Accordingly, the reference image having the stronger corresponding correlation to the image to be identified is irradiated by the beam of the stronger intensity, while the reference image having the weaker correlation to the image to be identified is irradiated by the weaker beam. The corresponding correlation can be determined by detecting the radiation intensity distribution of the image formed on the screen 52 with a two-dimensional photoelectric transducer 61 such as a charge coupled device (CCD). The spatial filter 3 is operated by the image processing and valve circuits 62 on the basis of the detected data.

The element to function as a spatial light modulator in the inventive associative identifier can be of electric addressing type and of optical addressing type. Examples of the electric addressing type may be a liquid crystal panel as used in the above Example, and a ceramic element and crystal having a photoelectric effect, such as PLZT, KDP and BSO ($Bi_{12}SiO_{20}$) provided with matrix electrodes.

Figure 7:
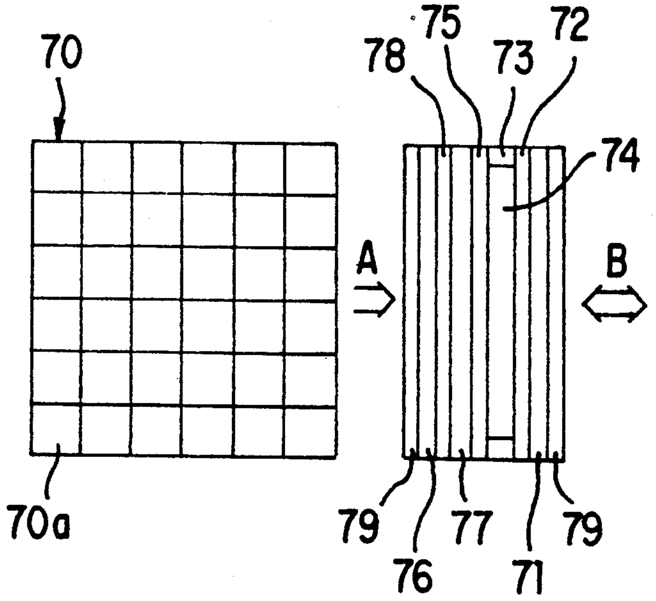
FIG. 7 schematically shows the structure of the reflection type liquid crystal light valve apparatus used in the inventive optical associative identifier.

Examples of the optical addressing type may be the structure including the similar ceramic material combined with a photoconductive layer as used in FIG. 7.

The material having a photorefractive effect, such as BSO and $BaTiO_3$ can change the refractive index induced by the electric field of the photo-induced electron charge of the material, depending on the intensity of the incident beam. In this instance, there is no need to provide a photoconductive layer. This spatial modulator may be of transparent type or of reflecting type. However, when the reading beam will entirely erase the information formed in the element of optical addressing type by the addressing beam, the wavelength range of the reading beam should be separated from that of the addressing beam in order to avoid the influence of the reading beam to the recorded information.

When the element of the electric addressing type is used, the two-dimensional photoelectric transducer and the driving circuit to drive the transducer are necessary to produce the input image, therefore, advantageously facilitating the processing of the electric signals.

An ordinary incoherent-to-coherent converter of the spatial light modulator reflecting type, using the optical addressing element and an ordinary converter, can be used for a display portion 16*b* for the image to be identified. Consequently, the optical system to produce the image for irradiating the input image on the incoherent-to-coherent converter to translate incoherent images into coherent images becomes necessary. In this case, a reference image display portion 16*a* can be easily constructed in optical form of the reflecting type, regardless of utilizing optical addressing or electrical addressing.

EXAMPLE 3

Figure 8:
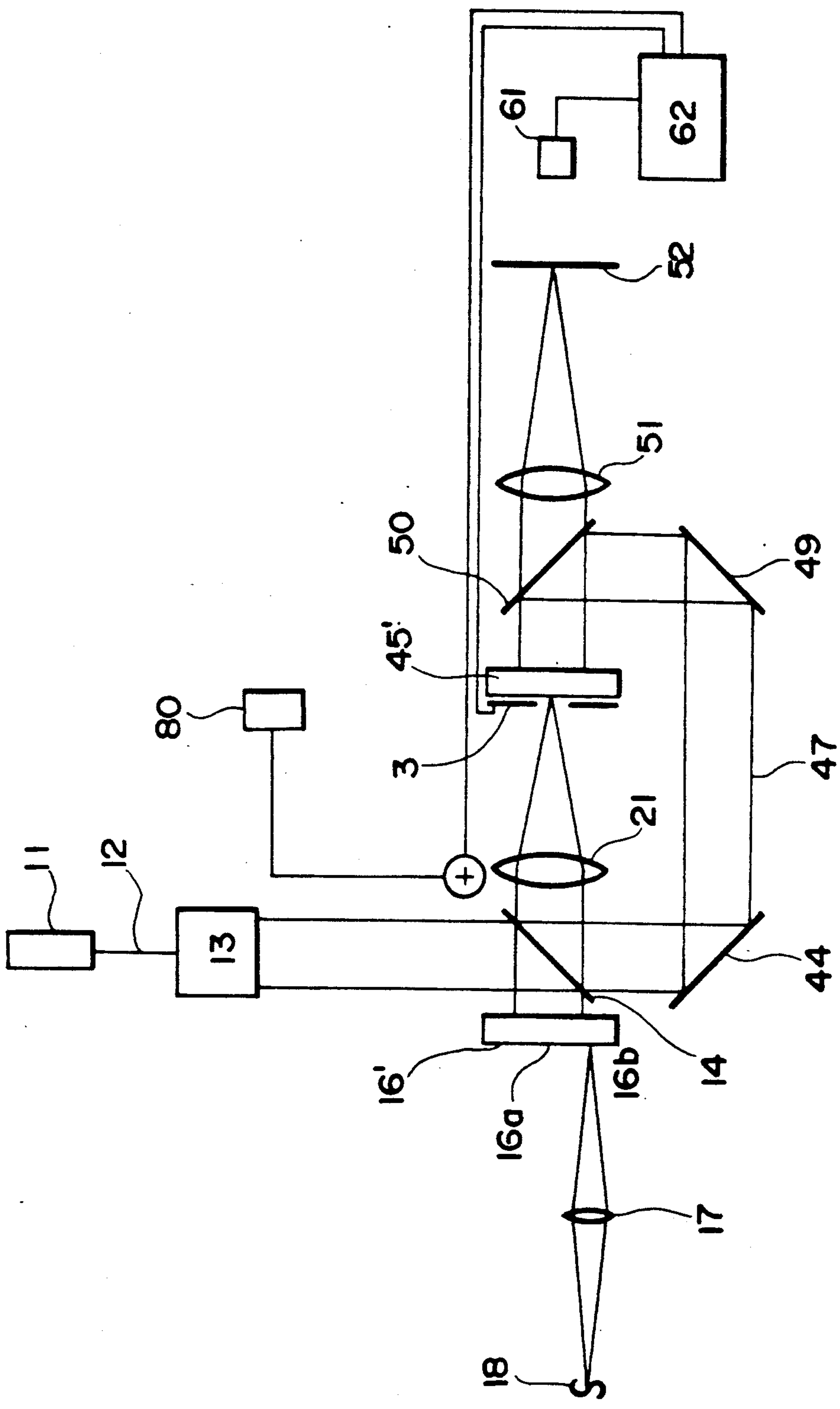
FIG. 8 shows a schematic illustration of a third type of the inventive optical associative identifier.

Another optical associative identifier according to the present invention uses a state-of-the-art converter to translate an incoherent beam into a coherent beam, as shown in FIG. 8.

The beam 12 emitting from a laser source 11 is reflected by a beam splitter 14 and enters into an image display apparatus 16'. The image display apparatus 16' essentially includes a converter to transform an incoherent beam into a coherent beam, each portion of which corresponds to each of the display portions for the image to be identified. A spatial light modulator of the reflecting and electrical addressing type, e.g. liquid crystal light valve, each of whose portions corresponds to each of the reference image display portions is also included. The converter, to transform an incoherent beam into a coherent beam, is irradiated by optically modulating an input from the opposite side, to that for the beam 12. This modulating input beam will form a focus on the point 16*b* forming the image on the surface of the converter 16', through a focusing lens 17 from the image of the image S to be identified.

The signals for the reference image display portions are given from the group of the reference images and information feed-back based on the corresponding correlation detected by the two-dimensional photoelectric transducer 61 to the reference images, i.e. the duplication of the respective reference image and the information of the light intensity, to emit from each of the reference images formed on the plane of the image display apparatus 16'. In other words, the image display apparatus 16'in the optical associative identifier of FIG. 8 functions as both the valve 15 and the image display apparatus 16 described in the associative identifier illustrated in FIG. 1.

The additional elements of FIG. 8 perform similar functions of the corresponding elements used in the associate identifier of FIG. 1 or 6, and have the corresponding numbers used in FIGS. 1 and 6. However, the explanations thereof are slightly different depending whether the spatial modulator employed is of the electric addressing or of optical addressing type, and whether it is of the transparent type or of the reflecting type.

When the spatial light modulator is used for reference image display portions, the reference image can be formed in nearly real time operation. In this instance, a number of reference images and the image to be identified can be formed at the first stage in the same plane in the form of outlined pictures or in low resolution. Associating is carried out resulting in decreasing the number of the candidates of the reference images, and the size of the displayed image is increased with increasing the resolution thereof. The candidate of the reference images can be selected with high accuracy to raise the correlation for detecting, which can establish the smooth and sure identification of the image.

The spatial filter 3 used in the above example can be regarded a spatial modulator, and this filter should better be of transparent and electric addressing type in both constructive and operational point of view.

The filter can be constructed by mechanical adjusting of the step of the aperture.

Therefore, the spatial light modulator can be any combination of the above-mentioned elements, and then, the inventive associative identifier can be composed in any combinations, and in various embodiments.

the identifier of the present invention does not need any holographic means for processing the corresponding correlation between the reference images and the image to be identified in real-time operation time. Further, the number of the reference images to be compared or to be associated with the image to be identified can be drastically raised by the inventive identifier.

Further, the spatial frequency range used in the identifier can be changed by using the same memory display for the reference images and the image to be identified, to determine the corresponding correlation, and therefore, the correct associating and identification of the images can be easily carried out by the inventive identifier.

While the present invention has been described with reference to the particular illustrative embodiments, it is not to be restricted by those embodiments but only the appended claims. It is to be appreciated that those skilled in the art can change or modify the embodiments without departing from the scope and spirit of the present invention.

We claim:

1. An optical associative identifier with real time joint transform correlator, comprising:

- a light source for producing a coherent beam;
- a beam splitter for splitting said coherent beam into first and second addressing beams;
- a first image output means for simultaneously displaying a plurality of coherent image consisting of at least an input image to be identified, and a plurality of reference images, and for modulating said first addressing beam to produce a first two-dimensional complex amplitude distribution pattern of said image to be identified and said reference images, and for modulating said first addressing beam having said first two-dimensional complex amplitude distribution pattern;
- a first optical Fourier transform means for optically Fourier transforming said first two-dimensional distribution complex amplitude pattern from said first image output means, said first optical Fourier transform means producing an output beam having an intensity distribution pattern according to a Fourier transform of said first two-dimensional complex amplitude distribution pattern;

a spatial filter restricting an area receiving said output beam from said first Fourier transform means, into a first spatial frequency range corresponding to the size of said image to be identified, and into a second spatial frequency range corresponding to a portion of said plurality of reference images with which said image to be identified is compared;

a second image output means capable of modulating a two-dimensional complex amplitude distribution of said second addressing beam based upon the intensity distribution pattern output from said first optical Fourier transform means and said spatial filter, to form a second two-dimensional complex amplitude distribution;

a second optical Fourier transform means for optically Fourier transforming said second two-dimensional complex amplitude distribution pattern output produced by said second image output means, and for providing an output pattern signal used to modify said output signal of said first image output means;

a means of detecting said output pattern signals produced by said second optical Fourier transform means, wherein said second two-dimensional complex amplitude distribution is optically Fourier transformed; and a spatial filter-control means for measuring the change of the output from said second optical Fourier transform means, determining whether said change is below a certain level, and expanding an area of said spatial filter through which light passes, when said change is below said certain level.

2. The optical associative identifier in accordance with claim 1, wherein said first image output means comprises, a first spatial light modulator means for modulating said first two-dimensional complex amplitude distribution pattern of the beam emitted from said light source; and one or more display unit means for displaying said plurality of reference images and said image to be identified by the input beam emitted from said first spatial light modulator.

3. The optical associative identifier in accordance with claim 2, wherein said first spatial light modulator means has a number of fractions in its display area, each of said fractions receiving a portion of said second two-dimensional complex amplitude distribution pattern produced by said second optical Fourier transform means, each of said fractions corresponding to each reference image of said first image output means, and each fraction changing its transmittance or reflectance corresponding to the intensity of said each portion of said two-dimensionally distributed amplitude pattern produced by said second optical Fourier transform means.

4. The optical associative identifier in accordance with claim 2, wherein the output signal from said second optical Fourier transform means is received by a first two-dimensional photoelectric transducer which produces an output signal, and said first spatial light modulator is operated to modulate in accordance with the output signal from said first two-dimensional photoelectric transducer, said first two-dimensional amplitude distribution pattern.

5. The optical associative identifier in accordance with claim 2, wherein each of said display units for displaying said plurality of reference images includes a spatial light modulator to be operated electrically for modulation.

6. The optical associative identifier in accordance with claim 2, wherein each of said display units for displaying said image to be identified comprises a converter for translating an incoherent beam into a coherent beam.

* * * * *